Figure 1:
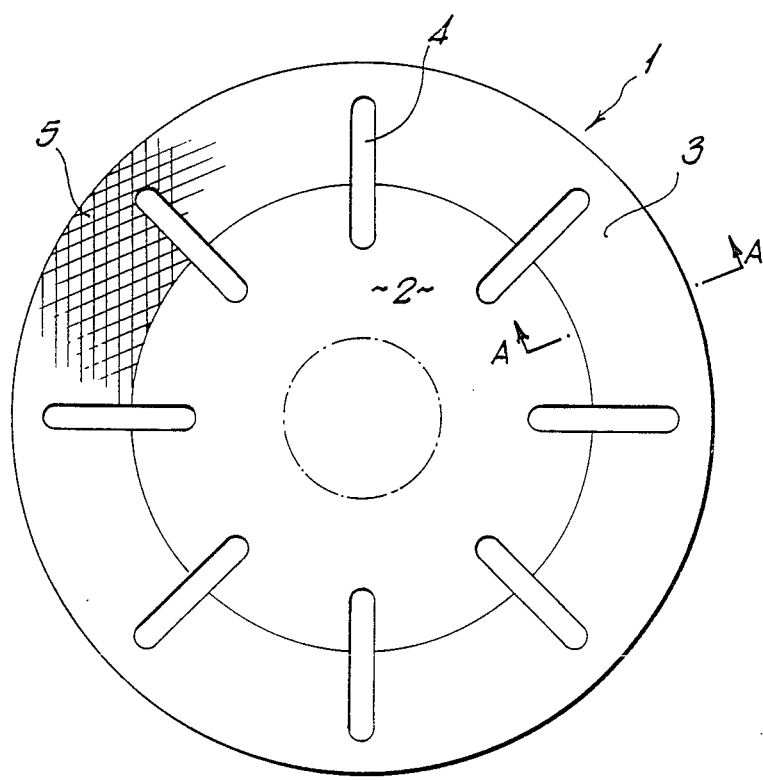

United States Patent [19]

Baker et al.

[11] Patent Number: 4,871,394
[45] Date of Patent: Oct. 3, 1989

[54] SINTERED METAL FRICTION FACING

[75] Inventors: Ralph Baker, Buxton; Stephen N. Foulkes, Chapel en le Frith, both of United Kingdom

[73] Assignee: Ferodo Limited, Manchester, England

[21] Appl. No.: 268,722

[22] Filed: Nov. 8, 1988

[30] Foreign Application Priority Data

Nov. 19, 1987 [GB] United Kingdom ............... 8727140

[51] Int. Cl.$^4$ .............................................. C22C 29/12
[52] U.S. Cl. ......................................... 75/232; 75/235; 75/243; 75/247; 419/11; 419/19
[58] Field of Search ................. 75/247, 243, 232, 235; 419/19, 11

[56] References Cited

U.S. PATENT DOCUMENTS

| | | | |
|---|---|---|---|
| 1,714,564 | 5/1929 | Koehler | 75/247 |
| 2,251,410 | 8/1941 | Koehring et al. | 29/189 |
| 2,273,589 | 2/1942 | Olt | 75/247 |
| 3,078,552 | 2/1963 | Grandey | 75/247 |

FOREIGN PATENT DOCUMENTS

| | | |
|---|---|---|
| 166435 | 6/1985 | European Pat. Off. . |
| 1201772 | 8/1970 | United Kingdom . |
| 2135411 | 8/1984 | United Kingdom . |
| 2148424 | 5/1985 | United Kingdom . |

Primary Examiner—Stephen J. Lechert, Jr.
Attorney, Agent, or Firm—Nixon & Vanderhye

[57] ABSTRACT

Sintered copper friction facing suitable for operation in oil and quieter in operation than current facing of this type has a void volume not less than 30% of the total volume. It can be made by employing, as the copper to form the facing matrix, copper powder which is in dendritic form and of apparent density not greater than 1.3 gram/cm$^3$.

7 Claims, 1 Drawing Sheet

SINTERED METAL FRICTION FACING

This invention relates to sintered metal friction facing, more particularly to friction facing in which the matrix of sintered metal is of copper, for use in brakes, clutches and the like operating in a medium of oil.

A known form of such facing has been used for many years on brakes in agricultural tractors and performs well except for its noise in operation. Our investigations have led us to the finding that the noise is associated with the degree of porosity of the facing, and that by increasing the volume of the pores or 'voids' above the existing value of 25% of the total volume, the noise generated by application of the brakes can be substantially reduced.

According to the invention, sintered copper friction facing for operation in oil has a void volume not less than 30% of the total volume.

Such facing can be obtained by employing, as the copper powder to be sintered, material which is in dendritic form and of apparent density not greater than 1.3 gram/cm$^3$, preferably less than 1 gram/cm$^3$. Such powder is commercially available for use in improving the properties of sintered iron parts and is obtained by electrochemical deposition under carefully controlled conditions, eg of cathode current density.

The necessary friction-imparting particles for inclusion within the matrix of sintered copper may be any of those conventionally used, eg hard particles of an inorganic oxide which is not volatile at the sintering temperature employed, such as silica and alumina. Similarly, as friction-modifier (ie to stabilise the coefficient of friction over a wide range of operating temperature) a conventional non-volatile material such as graphite may be used. Sintering at a temperature well below the melting point of copper (>1000° C.) can be achieved by the use—known in the manufacture of porous friction material—of lead, tin and zinc.

The invention is further illustrated by the following Example and with reference to the accompanying drawings, which are respectively a plan view (FIG. 1) of a tractor brake disc and a view in section (FIG. 2) looking in the direction of the arrows AA in FIG. 1.

The brake disc 1 comprises a core plate 2 of copper-plated steel having annular friction facings 3 of sintered copper. Each facing is in its entirety waffle-grooved, as shown in part at 5 in FIG. 1; and slots 4 in the core plate and facings help convey oil to the grooves during rotation of the disc.

EXAMPLE

A mixture of the following ingredients was prepared:

|  | Parts by weight |
| --- | --- |
| Dendritic-form copper | 65 |
| 95% passing 63 μm aperture sieve | |
| specific surface area 2,500 cm$^2$/gram | |
| *apparent density 0.8 gram/cm$^3$ | |
| Silica flour | 15 |
| Fine synthetic grade graphite | 7 |
| Zinc powder | 6 |
| Tin powder | 4 |
| Lead powder | 3 |
| | 100 parts by weight |

*Apparent density = mass per unit volume (grams/cm$^3$) of loosely poured powder, as determined by DIN ISO 3923 (1980) part 1.

Figure 2:
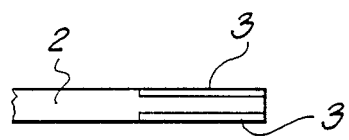

The mixture (apparent density, 0.88–0.93 gram/cm$^3$) was transferred to a die of shape generally corresponding to annular element 3 in FIGS. 1 and 2, and was pressed at ambient temperature to yield compacts of density (mass÷total volume) 2.9–3.1 grams/cm$^3$. The compacts were carefully removed from the press, and assemblies of compact-(core plate)-compact were prepared and stacked one upon another, adjacent assemblies being separated by a film of graphite to prevent adhesion during subsequent sintering of the copper.

The stacks were heated at 650° C. for 1 hour in a non-oxidising atmosphere under a pressure of 75 psi (520 KN/m$^2$) to bring about sintering of the copper and bonding of the facings to the core plates.

Final density (mass÷total volume) of the facings was in the range 3.25–3.75 gram/cm$^3$, corresponding to a voids volume in the range 42–33%. Thus:

| | Parts by weight | | Absolute density | Parts by volume |
| --- | --- | --- | --- | --- |
| Copper | 65 | ÷ | 8.92 | 7.29 |
| Silica | 15 | ÷ | 2.63 | 5.70 |
| Graphite | 7 | ÷ | 2.25 | 3.11 |
| Lead | 3 | ÷ | 11.36 | 0.26 |
| Tin | 4 | ÷ | 7.28 | 0.55 |
| Zinc | 6 | ÷ | 7.14 | 0.84 |
| | 100 | | | 17.75 |

Actual volume (i) = 100/3.25 = 30.77; whence
voids volume = (30.77−17.75)/30.77
= 42%
(ii) = 100/3.75 = 26.67; whence
voids volume = 33%

The facings were finally machined to the desired thickness (4.83 mm)

We claim:

1. A method of making a friction facing suitable for operation in oil, comprising sintering a mixture comprising a major proportion by weight of copper powder and a minor proportion by weight of friction-imparting particles, said copper powder being in dendritic form and of apparent density not greater than 1.3 gram/cm$^3$, to obtain a facing having a void volume not less than 30% of the total volume.

2. A method according to claim 1, in which the copper powder has an apparent density less than 1 gram/cm$^3$.

3. A method according to claim 1, in which the friction-imparting particles are of a non-volatile inorganic oxide.

4. A method according to claim 3, in which the inorganic oxide is silica.

5. A method according to claim 1, in which sintering is carried out in the presence of graphite as friction-modifier.

6. A method according to claim 1, in which sintering is carried out in the presence of lead, tin and zinc.

7. Sintered copper friction facing suitable for operation in oil, having a void volume not less than 30% of the total volume of the facing, obtained by sintering, in the presence of silica and graphite, copper powder which is in dendritic form and of apparent density not greater than 1.3 gram/cm$^3$.

* * * * *